United States Patent
Sumi et al.

(10) Patent No.: US 8,867,166 B2
(45) Date of Patent: Oct. 21, 2014

(54) SPINDLE MOTOR AND DISK DRIVE APPARATUS

(71) Applicant: Nidec Corporation, Kyoto (JP)

(72) Inventors: Shigeharu Sumi, Kyoto (JP); Toshikazu Himeno, Kyoto (JP); Hongbing Du, Singapore (SG); Junichi Hashimoto, Kyoto (JP); Kazuya Enokizono, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 13/755,860

(22) Filed: Jan. 31, 2013

(65) Prior Publication Data
US 2013/0201812 A1    Aug. 8, 2013

Related U.S. Application Data

(60) Provisional application No. 61/594,603, filed on Feb. 3, 2012.

(51) Int. Cl.
| | | |
|---|---|---|
| G11B 19/20 | (2006.01) | |
| H02K 3/47 | (2006.01) | |
| G11B 17/028 | (2006.01) | |
| H02K 21/24 | (2006.01) | |
| H02K 1/18 | (2006.01) | |

(52) U.S. Cl.
CPC ............ H02K 21/24 (2013.01); G11B 19/2009 (2013.01); H02K 3/47 (2013.01); G11B 17/0282 (2013.01); H02K 2211/03 (2013.01); H02K 1/182 (2013.01)
USPC ................ 360/99.08; 360/98.07; 310/156.26; 310/67 R

(58) Field of Classification Search
CPC .. G11B 19/2009; G11B 17/038; H02K 7/085; H02K 21/22; H02K 3/00; H02K 3/26; F16C 2370/12
USPC ......... 360/99.08, 98.07, 99.04; 310/67 R, 90, 310/156.12, 156.26, 208; 29/596
See application file for complete search history.

(56) References Cited

U.S. PATENT DOCUMENTS 4,401,419 A * 8/1983 Rabe ............................ 417/415
4,987,333 A * 1/1991 Noguchi et al. .............. 310/268
(Continued)

FOREIGN PATENT DOCUMENTS

| DE | 29705634 U1 * | 5/1997 |
|---|---|---|
| JP | 2005-348572 A | 12/2005 |
| SG | 135981 A1 | 10/2007 |

OTHER PUBLICATIONS

Himeno et al., U.S. Appl. No. 13/856,055, filed Apr. 3, 2013.
(Continued)

*Primary Examiner* — Will J Klimowicz
(74) *Attorney, Agent, or Firm* — Westerman, Hattori, Daniels & Adrian, LLP

(57) ABSTRACT

A spindle motor includes a flat stator, a rotor magnet arranged above the stator, and a magnetic portion made of a ferromagnetic material. The magnetic portion is positioned lower than the stator and the magnetic portion are axially overlapped with coils. A magnetic attraction force is generated between the magnetic portion and the rotor magnet. Since the magnetic portion is positioned lower than the stator, it is possible to cause magnetic fluxes to efficiently flow between the rotor magnet and the stator. Further, the stator includes a protrusion protruded radially outward beyond an outer circumferential portion of a rotor hub. Accordingly, in a plan view, the stator is positioned radially outward of the rotor hub.

25 Claims, 13 Drawing Sheets

(56) References Cited

U.S. PATENT DOCUMENTS

| | | | |
|---|---|---|---|
| 5,392,176 A * | 2/1995 | Anderson | 360/99.24 |
| 5,598,048 A * | 1/1997 | Dunfield et al. | 310/90.5 |
| 5,796,193 A * | 8/1998 | Sakano et al. | 310/67 R |
| 5,969,909 A * | 10/1999 | Cheong | 360/271.7 |
| 6,195,226 B1 * | 2/2001 | Papst | 360/99.08 |
| 6,445,096 B1 | 9/2002 | Saito et al. | |
| 6,801,388 B2 | 10/2004 | Kayama et al. | |
| 7,109,631 B2 * | 9/2006 | Tsai et al. | 310/268 |
| 7,282,833 B2 * | 10/2007 | Kim et al. | 310/268 |
| 8,176,920 B2 | 5/2012 | Young | |
| 2013/0257229 A1 * | 10/2013 | Himeno et al. | 310/425 |
| 2013/0258522 A1 * | 10/2013 | Himeno et al. | 360/99.08 |
| 2013/0313935 A1 * | 11/2013 | Himeno et al. | 310/156.32 |

OTHER PUBLICATIONS

Himeno et al., U.S. Appl. No. 13/780,327, filed Feb. 28, 2013.
Himeno et al., U.S. Appl. No. 13/867,505, filed Apr. 22, 2013.
Himeno et al., Singapore Patent Application No. 201202345-3; filed on Mar. 30, 2012.

* cited by examiner

SPINDLE MOTOR AND DISK DRIVE APPARATUS

BACKGROUND OF THE INVENTION

1. Field of the Invention

The present invention relates to a spindle motor and a disk drive apparatus.

2. Description of the Related Art

A hard disk device is equipped with a spindle motor for rotating a disk. One example of conventional spindle motors is disclosed in, e.g., SG 135981. A permanent-magnet synchronous motor disclosed in SG 135981 includes a permanent magnet attached to at least one of a top yoke and a bottom yoke and an armature arranged in an air gap between the permanent magnet and the other yoke.

A so-called axial gap structure in which an armature and a permanent magnet are axially opposed to each other as in SG 135981 is more advantageous in reducing the thickness of a motor than a so-called radial gap structure in which an armature and a permanent magnet are radially opposed to each other. However, the radial gap structure and the axial gap structure differ fundamentally from each other in the arrangement of individual components within the motor. In order to increase the manufacturing efficiency and driving efficiency of the motor, it is therefore necessary for the axial gap structure to adopt structural features differing from those of the radial gap structure.

SUMMARY OF THE INVENTION

In accordance with a first aspect of the present invention, there is provided a spindle motor, including: a stationary unit; and a rotary unit rotatable about a center axis with respect to the stationary unit, wherein the stationary unit includes a base plate provided with a step portion and a stator provided with a coil and arranged on the base plate, the rotary unit includes a rotor hub arranged axially above the base plate, a rotor magnet arranged above the stator and axially opposed to the stator with a first gap left between the rotor magnet and the stator and a rotor yoke arranged between the stator and the base plate and axially opposed to the stator with a second gap left between the yoke and the stator, the stator includes a protrusion positioned radially outward of the coil to protrude radially outward beyond an outer circumferential portion of the rotor hub, and the protrusion includes an outer circumferential portion kept in contact with a wall surface of the step portion or opposed to the wall surface of the step portion with a clearance left therebetween.

In accordance with a second aspect of the present invention, there is provided a spindle motor, including: a stationary unit; and a rotary unit rotatable about a center axis with respect to the stationary unit, wherein the stationary unit includes a base plate provided with a step portion and a stator provided with a coil and arranged on the base plate, the rotary unit includes a rotor hub arranged axially above the base plate, a rotor magnet arranged above the stator and axially opposed to the stator with a first gap left between the rotor magnet and the stator and a rotor yoke arranged between the stator and the base plate and axially opposed to the stator with a second gap left between the yoke and the stator, the stator includes a protrusion positioned radially outward of the coil to protrude radially outward beyond an outer circumferential portion of the rotor hub, and the stator is fixed to the step portion by an adhesive agent.

In accordance with a third aspect of the present invention, there is provided a spindle motor for use in a disk drive apparatus provided with a disk, including: a stationary unit; and a rotary unit rotatable about a center axis with respect to the stationary unit, wherein the stationary unit includes a base plate and a stator provided with a coil and arranged on the base plate, the rotary unit includes a rotor hub arranged axially above the base plate, a rotor magnet arranged above the stator and axially opposed to the stator with a first gap left between the rotor magnet and the stator and a rotor yoke arranged between the stator and the base plate and axially opposed to the stator with a second gap left between the yoke and the stator, the stator includes a protrusion positioned radially outward of the coil to protrude radially outward beyond an outer circumferential portion of the rotor hub, and the protrusion is opposed to the disk in an axially spaced-apart relationship.

In accordance with a fourth aspect of the present invention, there is provided a spindle motor, including: a stationary unit; and a rotary unit rotatable with respect to the stationary unit through a bearing mechanism, wherein the stationary unit includes a flat stator arranged radially outward of the bearing mechanism to extend in a direction orthogonal to a center axis extending up and down, a base plate arranged to support the stator and a magnetic portion made of a ferromagnetic material, the rotary unit includes a rotor magnet opposed to an upper surface of the stator, a rotor yoke opposed to a lower surface of the stator and made of a ferromagnetic material, and a rotor hub arranged to interconnect the rotor magnet and the rotor yoke and made of a ferromagnetic material, the stator includes a plurality of coils arranged along a circumferential direction, and the magnetic portion is positioned lower than the stator, the coils and the magnetic portion axially overlapping with each other.

In accordance with a fifth aspect of the present invention, there is provided a spindle motor, including: a stationary unit; and a rotary unit rotatable with respect to the stationary unit through a bearing mechanism, wherein the stationary unit includes a flat stator arranged radially outward of the bearing mechanism to extend in a direction orthogonal to a center axis extending up and down, a base plate arranged to support the stator and a magnetic portion made of a ferromagnetic material, the rotary unit includes a rotor magnet opposed to an upper surface of the stator, a rotor yoke opposed to a lower surface of the stator and made of a ferromagnetic material, and a rotor hub arranged to interconnect the rotor magnet and the rotor yoke and made of a ferromagnetic material, and the base plate is made of non-magnetic metal, the magnetic portion being a component differing from the base plate, the magnetic portion being fixed to the base plate and positioned lower than the stator.

The above and other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Illustrative embodiments of the present invention will now be described with reference to the drawings which form a part hereof. In the subject application, the direction parallel to the center axis of the spindle motor will be referred to as "axial". The direction orthogonal to the center axis of the spindle motor will be referred to as "radial". The direction extending along an arc about the center axis of the spindle motor will be referred to as "circumferential". In the subject application, the shape and positional relationship of individual components will be described under the assumption that the axial direction is an up-down direction and that the side of the stator facing the rotor magnet is an upper side. However, such definition of the up-down direction is not intended to limit the in-use direction of the spindle motor and the disk drive apparatus according to the present invention.

In the subject application, the term "parallel" includes the term "substantially parallel". The term "orthogonal" includes the term "substantially orthogonal".

Figure 1:
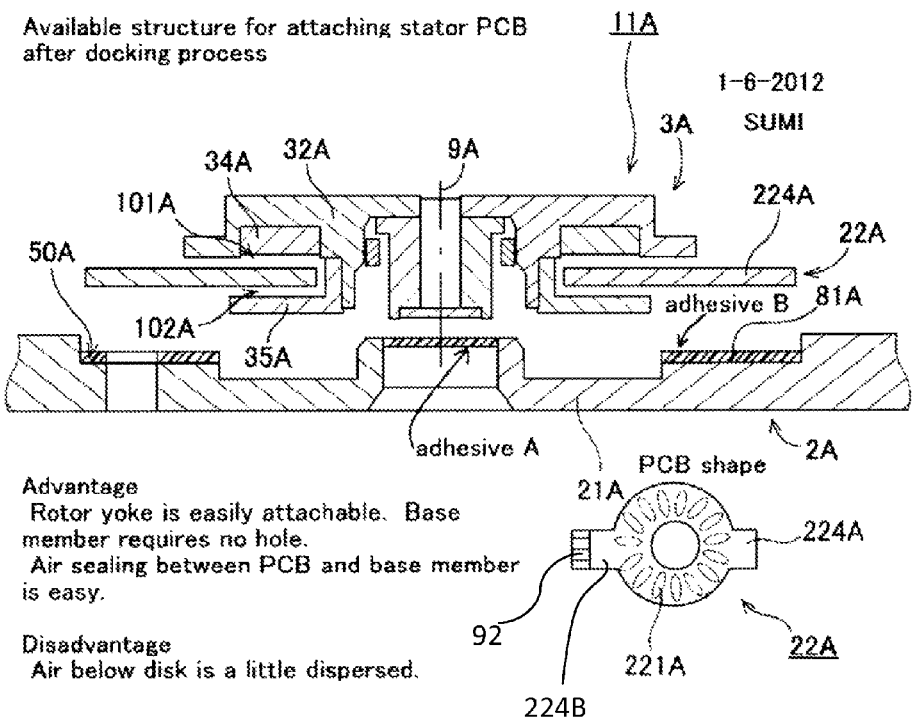
FIG. 1 is an exploded vertical section view showing a spindle motor according to a first preferred embodiment of the present invention.

FIG. 1 is an exploded vertical section view showing a spindle motor 11A according to a first preferred embodiment of the present invention. The spindle motor 11A is used in, e.g., a disk drive apparatus provided with a disk. As shown in FIG. 1, the spindle motor 11A preferably includes a stationary unit 2A and a rotary unit 3A. The rotary unit 3A is supported to rotate about the center axis 9A with respect to the stationary unit 2A.

The stationary unit 2A preferably includes a base plate 21A and a stator 22A. As shown in FIG. 1, the base plate 21A of the present embodiment preferably includes a step portion 50A. The stator 22A is arranged on the base plate 21A. The base plate 21A and the stator 22A are fixed to each other by, e.g., an adhesive agent 81A. A plan view of the stator 22A is depicted at the right lower region in FIG. 1. As can be seen in the plan view, the stator 22A preferably includes a plurality of coils 221A arranged along the circumferential direction.

The rotary unit 3A preferably includes a rotor hub 32A, a rotor magnet 34A and a rotor yoke 35A. The rotor hub 32A is arranged axially above the base plate 21A. The rotor magnet 34A is arranged above the stator 22A. The lower surface of the rotor magnet 34A and the upper surface of the stator 22A are axially opposed to each other with a first gap 101A left therebetween. The rotor yoke 35A is arranged between the stator 22A and the base plate 21A. The upper surface of the rotor yoke 35A and the lower surface of the stator 22A are axially opposed to each other with a second gap 102A left therebetween.

As shown in FIG. 1, the stator 22A of the present embodiment preferably includes a protrusion 224A. The protrusion 224A is positioned radially outward of the coils 221A to protrude radially outward beyond the outer circumferential portion of the rotor hub 32A. In other words, when seen in a top view, the protrusion 224A of the stator 22A is positioned radially outward of the rotor hub 32A. For that reason, when manufacturing the spindle motor 11A, the protrusion 224A of the stator 22A can be pressed against the base plate 21A without being impeded by the rotor hub 32A. This makes it easy to fix the stator 22A to the base plate 21A.

The outer circumferential portion of the protrusion 224A may be kept in contact with the wall surface of the step portion 50A or may be radially opposed to the step portion 50A with a clearance left therebetween. The protrusion 224A is fixed to the step portion 50A by, e.g., an adhesive agent 81A. If the disk is attached to the spindle motor 11A, the lower surface of the disk and the upper surface of the protrusion 224A are axially opposed to each other with a clearance left therebetween. The stator 22 is arranged on the base plate 21. The protrusion 224B is radially outward the coil. The protrusion 224B includes a power feeding portion 92. As shown in FIG. 1, the second protrusion 224A is extended opposite to the first protrusion 224B. The second protrusion 224A extends radially outward the rotor hub 32 such that a second periphery 224D of the second protrusion 224A is fixed on the upper surface of the step portion 50.

The stator 22A may include a single protrusion 224A or may include a plurality of protrusions 224A arranged along the circumferential direction. The protrusions 224A may be connected to one another to have a ring shape in the circumferential direction. One or more protrusions 224A may be provided in the outer circumferential portion of the stator 22A. It is however preferred that the circumferential positions of the protrusions 224A are not too much uneven. For example, it is preferred that, when the stator 22A is divided into two parts by an arbitrary plane containing the center axis 9A, each of the parts includes a portion or a whole portion of each of the protrusions 224A.

Figure 13:
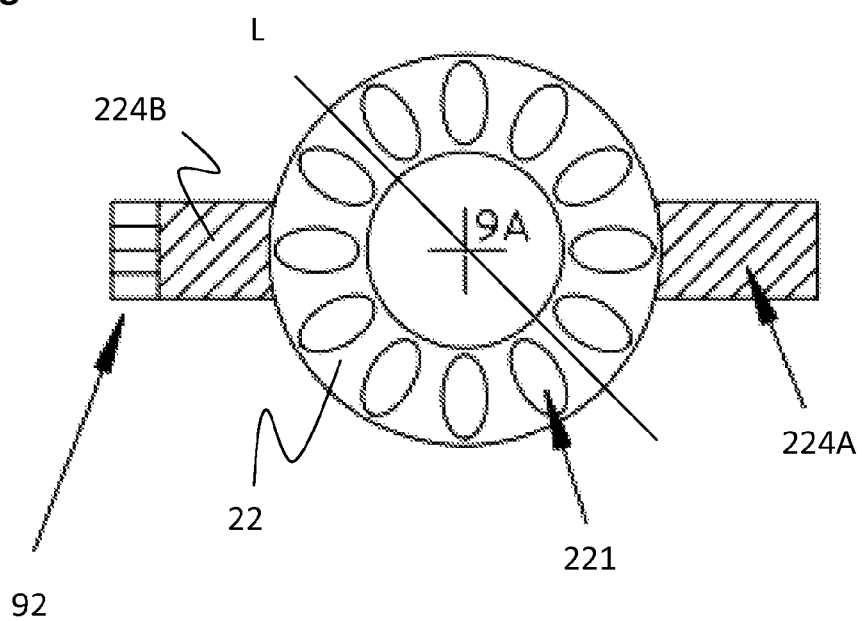
FIG. 13 is a plan view of the stator 22A shown in FIG. 1.

The following structures are included in FIG. 1. The spindle motor includes stationary unit and a rotary unit rotatable about a center axis with respect to the stationary unit. The stationary unit includes a base plate provided with a step portion and a stator provided with a coil and arranged on the base plate. The rotary unit includes a rotor hub, a rotor magnet and a rotor yoke. The rotor hub is arranged axially above the base plate. The rotor magnet is arranged above the stator and axially opposed to the stator with a first gap left between the rotor magnet and the stator. The rotor yoke is arranged between the stator and the base plate and is axially opposed to the stator with a second gap left between the rotor yoke and the stator. The stator includes a plurality of protrusions positioned radially outward of the coil to protrude radially outward beyond an outer circumferential portion of the rotor hub. The protrusions are shaped such that, when the stator is divided into two parts by an arbitrary plane containing the center axis, each of the parts includes a portion or a whole portion of each of the protrusions. With this spindle motor, when seen in a top view, the protrusions of the stator are positioned radially outward of the rotor hub. This makes it easy to fix the stator to the base plate during the manufacture of the spindle motor. As shown in the upper stator shown in FIG. 13, the stator 22 can be divided into two parts by a plane L containing the center axis 9A such that each of divided portions thus prepared includes a whole portion of the protrusion 224B and the protrusion 224A. The protrusion 224B includes the power feeding portion 92.

Figure 2:
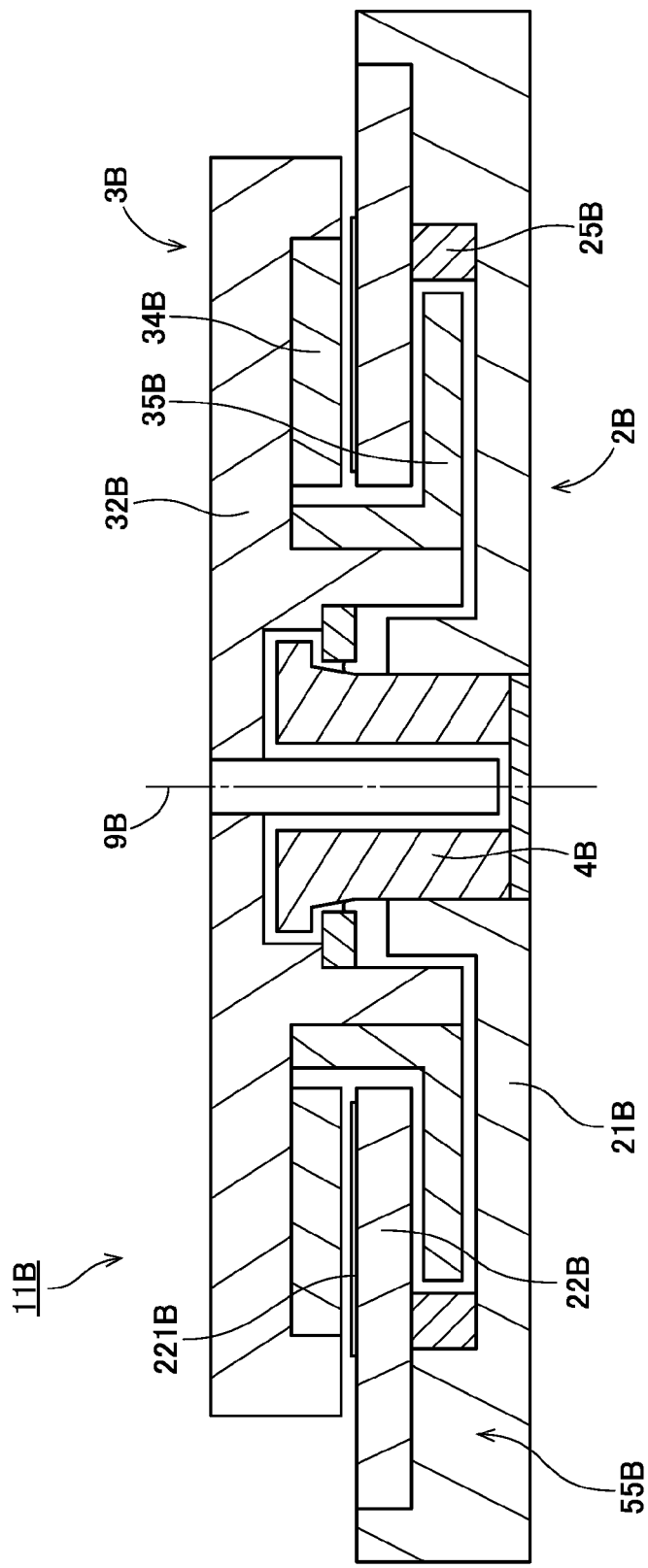
FIG. 2 is a vertical section view showing a spindle motor according to a second preferred embodiment of the present invention.

FIG. 2 is a vertical section view showing a spindle motor 11B according to a second preferred embodiment of the present invention. As shown in FIG. 2, the spindle motor 11B preferably includes a stationary unit 2B and a rotary unit 3B. The rotary unit 3B is rotatably supported on the stationary unit 2B through a bearing mechanism 4B.

The stationary unit 2B preferably includes a base plate 21B, a stator 22B and a magnetic portion 25B. The stator 22B is positioned radially outward of the bearing mechanism 4B to extend in a flat shape along a direction orthogonal to the center axis 9B. The stator 22B preferably includes a plurality of coils 221B. The coils 221B are arranged along the circumferential direction. The stator 22B is supported on the base plate 21B.

The rotary unit 3B preferably includes a rotor hub 32B, a rotor magnet 34B and a rotor yoke 35B. The lower surface of the rotor magnet 34B and the upper surface of the stator 22B are axially opposed to each other. The upper surface of the rotor yoke 35B and the lower surface of the stator 22B are axially opposed to each other. The rotor hub 32B and the rotor yoke 35B are made of, e.g., a ferromagnetic material. The rotor magnet 34B and the rotor yoke 35B are connected to each other by the rotor hub 32B.

The magnetic portion 25B is positioned below the stator 22B. The coils 221B and the magnetic portion 25B axially overlap with each other. The magnetic portion 25B is made of, e.g., a ferromagnetic material. For that reason, a magnetic attraction force is generated between the magnetic portion 25B and the rotor magnet 34B. Accordingly, the rotary unit 3B is pulled downward.

Assuming that the magnetic portion 25B is positioned above the stator 22B, the flow of magnetic fluxes between the rotor magnet 34B and the stator 22B may possibly be impeded by the magnetic portion 25B. In the spindle motor 11B of the present embodiment, however, the magnetic portion 25B is arranged below the stator 22B. For that reason, the magnetic fluxes can efficiently flow between the rotor magnet 34B and the stator 22B.

Figure 3:
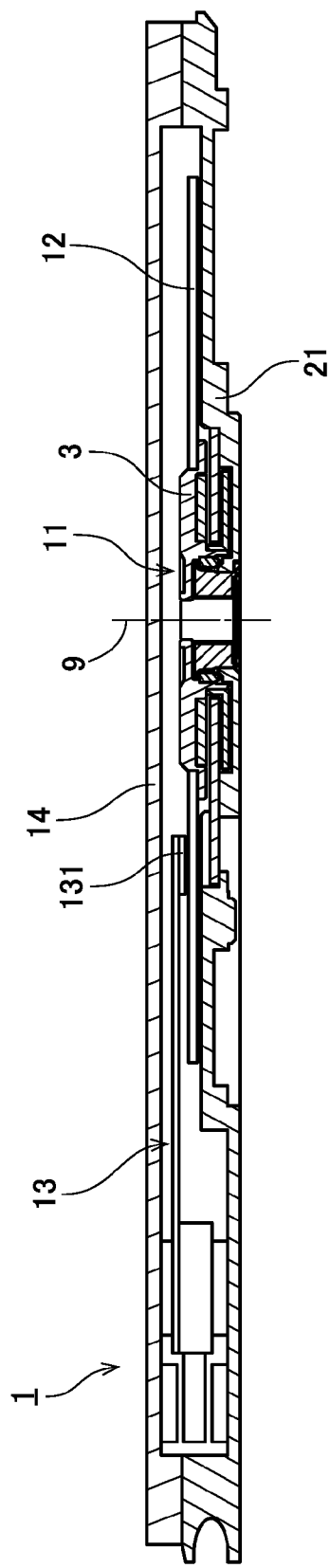
FIG. 3 is a vertical section view showing a disk drive apparatus according to a third preferred embodiment of the present invention.

FIG. 3 is a vertical section view showing a disk drive apparatus 1 according to a third preferred embodiment. The disk drive apparatus 1 is an apparatus for performing information reading and writing tasks with respect to, e.g., a magnetic disk 12 while rotating the magnetic disk 12. As shown in FIG. 2, the disk drive apparatus 1 preferably includes a spindle motor 11, a magnetic disk 12, an access unit 13 and a cover 14.

The spindle motor 11 is arranged to rotate the magnetic disk 12 about the center axis 9 while supporting the magnetic disk 12. The spindle motor 11 preferably includes a base plate 21 radially extending at the lower side of the magnetic disk 12. The rotary unit 3 of the spindle motor 11, the magnetic disk 12 and the access unit 13 are accommodated within a housing made up of the base plate 21 and the cover 14. The access unit 13 causes a head 131 to move along the recording surface of the magnetic disk 12, thereby performing information reading and writing tasks with respect to the magnetic disk 12.

The disk drive apparatus 1 may be provided with two or more magnetic disks 12. The access unit 13 may perform only one of the information reading and writing tasks with respect to the magnetic disk 12.

Figure 4:
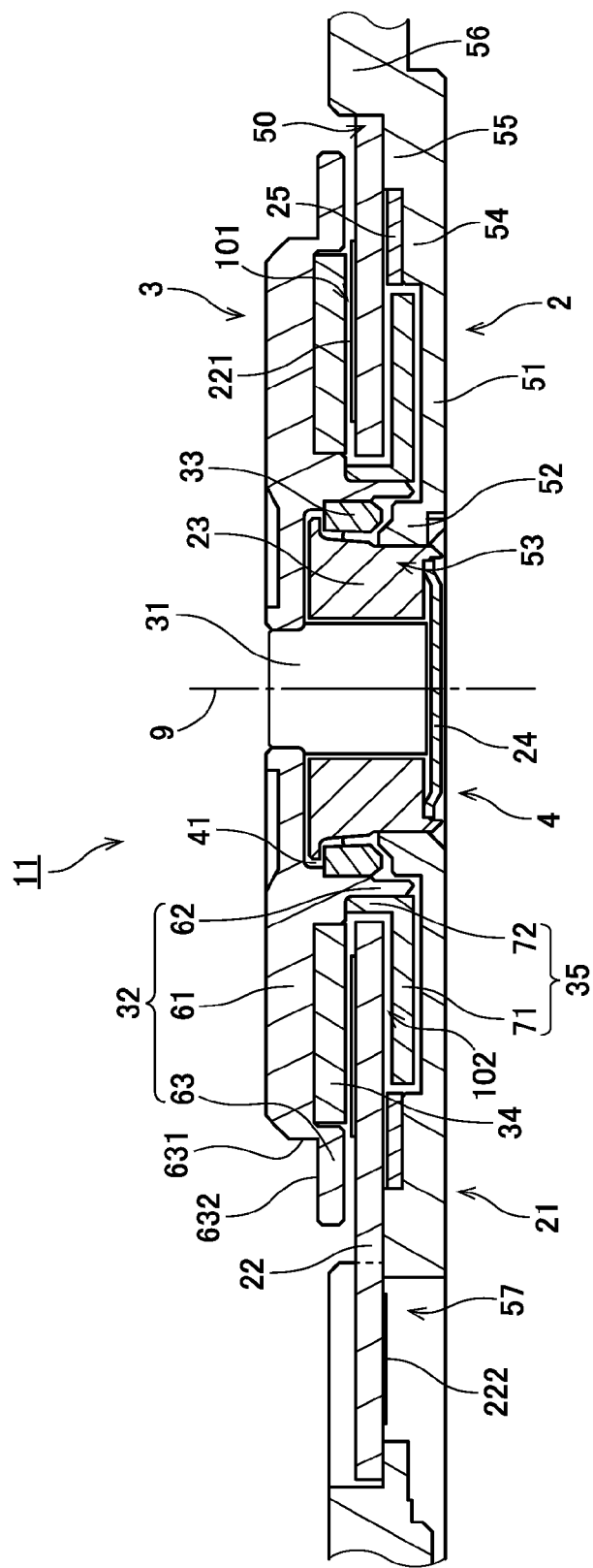
FIG. 4 is a vertical section view showing a spindle motor according to the third preferred embodiment of the present invention.
Figure 5:
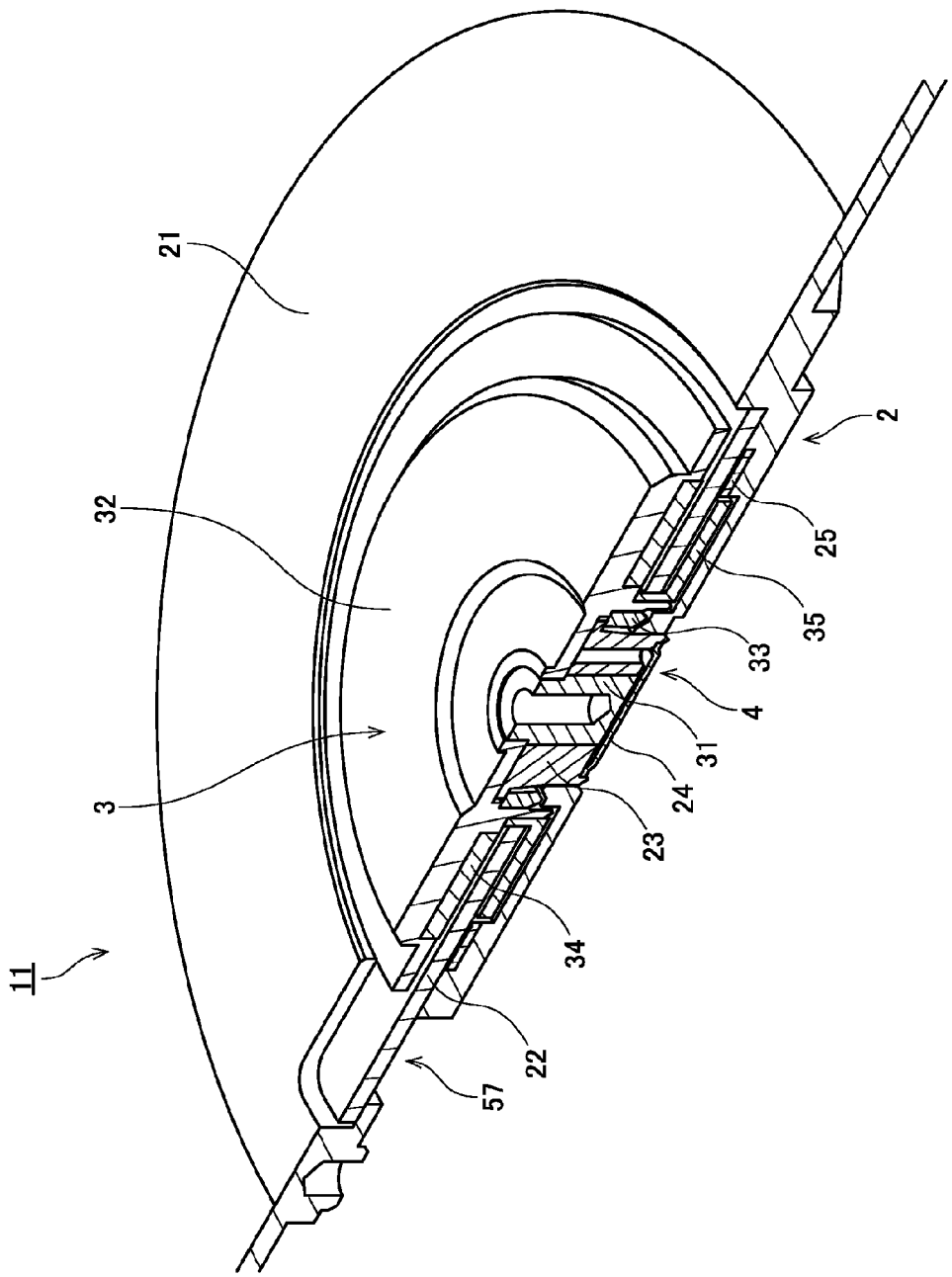
FIG. 5 is a broken perspective view of the spindle motor according to the third preferred embodiment of the present invention.

Next, description will be made on the configuration of the spindle motor 11. FIG. 4 is a vertical section view of the spindle motor 11. FIG. 5 is a broken perspective view of the spindle motor 11. As shown in FIGS. 4 and 5, the spindle motor 11 preferably includes a stationary unit 2 and a rotary unit 3. The stationary unit 2 is kept stationary with respect to the base plate 21 and the cover 14. The rotary unit 3 is rotatably supported on the stationary unit 2 through a bearing mechanism 4.

The stationary unit 2 of the present embodiment preferably includes a base plate 21, a stator 22, a sleeve 23, a cap 24 and a magnetic portion 25.

The base plate 21 is arranged to support the stator 22, the sleeve 23 and the magnetic portion 25. The base plate 21 can be produced by casting, e.g., aluminum alloy as non-magnetic metal. As shown in FIGS. 4 and 5, the base plate 21 of the present embodiment preferably includes a bottom plate portion 51, an inner protrusion portion 52, a base through-hole 53, a first outer protrusion portion 54, a second outer protrusion portion 55, a third outer protrusion portion 56 and a window portion 57.

The bottom plate portion 51 is arranged below the below-mentioned rotor yoke 35 to extend in a direction orthogonal to the center axis 9. The inner protrusion portion 52 extends upward from the inner circumferential portion of the bottom plate portion 51 in a substantially cylindrical shape. The inner protrusion portion 52 is positioned radially inward of the below-mentioned hub protrusion portion 62. The base through-hole 53 is positioned radially inward of the inner protrusion portion 52 to axially extend through the base plate 21. The window portion 57 is positioned below the below-mentioned electrode 222 to axially extend through the base plate 21.

The first outer protrusion portion 54 protrudes upward from the radial outer end portion of the bottom plate portion 51. The first outer protrusion portion 54 is positioned radially outward of the below-mentioned rotor yoke 35. The second outer protrusion portion 55 protrudes further upward at the radial outer side of the first outer protrusion portion 54. In other words, the upper surface of the second outer protrusion portion 55 is higher than the upper surface of the first outer protrusion portion 54. The third outer protrusion portion 56 protrudes further upward at the radial outer side of the second outer protrusion portion 55. In other words, the upper surface of the third outer protrusion portion 56 is higher than the upper surface of the second outer protrusion portion 55. As set forth above, the base plate 21 of the present embodiment includes a plurality of step portions 50 arranged at the radial outer side of the bottom plate portion 51.

The base plate 21 may be formed of a plurality of components. For example, the portion of the base plate 21 supporting the stator 22 or the magnetic portion 25 may be formed of a component differing from the remaining portion.

The stator 22 is a flat circuit board extending in a direction orthogonal to the center axis 9. The stator 22 is arranged radially outward of the bearing mechanism 4, below the below-mentioned rotor magnet 34 and above the yoke plate portion 71 of the below-mentioned rotor yoke 35. The outer circumferential portion of the stator 22 is arranged on the upper surface of the second outer protrusion portion 55.

Figure 6:
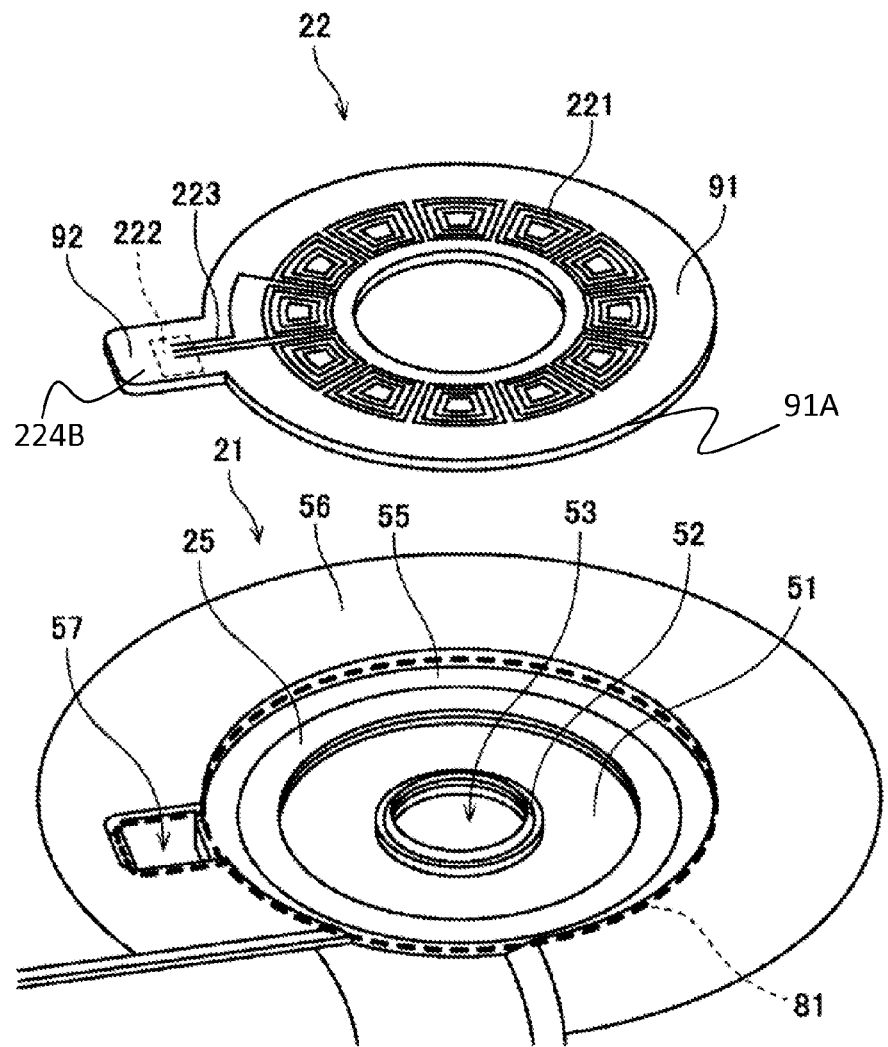
FIG. 6 is an exploded perspective view showing a base plate and a stator according to the third preferred embodiment of the present invention.

FIG. 6 is a broken perspective view of the base plate 21 and the stator 22. As shown in FIG. 6, the stator 22 preferably includes a ring-shaped plate portion 91 and a power feeding portion 92. The ring-shaped plate portion 91 annularly extends around the center axis 9. The outer circumferential portion of the ring-shaped plate portion 91 is kept in contact with the inner circumferential surface of the third outer protrusion portion 56 or opposed to the inner circumferential surface of the third outer protrusion portion 56 with a small clearance left therebetween. The power feeding portion 92 protrudes radially outward in a flat shape from a portion of the outer circumferential portion of the ring-shaped plate portion 91. The radial outer end portion of the power feeding portion 92 is positioned radially outward of the inner circumferential surface of the third outer protrusion portion 56. As shown in amended FIG. 6, the stator 22 includes a ring-shaped plate portion 91 to surround the coil. The ring-shaped plate portion 91 is provided between the coil and the protrusion 224B. A periphery 91A of the ring-shaped plate portion 91 is extended radially outward the rotor hub 32. The periphery 91A of the ring-shaped plate portion 91 is fixed on the upper surface of the step portion 50.

The ring-shaped plate portion 91 preferably includes a plurality of coils 221. The coils 221 are arranged along the circumferential direction. Each of the coils 221 is made of a copper foil to have, e.g., a spiral pattern. The power feeding portion 92 preferably includes an electrode 222 to which a lead wire is connected. The electrode 222 is connected to a copper foil 223 extending from the radial outer end portion of each of the coils 221 toward the power feeding portion 92. When the disk drive apparatus 1 is in use, a drive current is supplied from the lead wire to the coils 221 through the electrode 222 and the copper foil 223.

Referring back to FIGS. 4 and 5, the sleeve 23 is arranged around the below-mentioned shaft 31 to axially extend in a substantially cylindrical shape. The lower portion of the sleeve 23 is inserted into the base through-hole 53 and is fixed to the inner circumferential surface of the inner protrusion portion 52. The inner circumferential surface of the sleeve 23 is radially opposed to the outer circumferential surface of the shaft 31. The opening of the lower portion of the sleeve 23 is closed by the cap 24.

The rotary unit 3 of the present embodiment preferably includes a shaft 31, a rotor hub 32, a ring-shaped member 33, a plurality of rotor magnets 34 and a rotor yoke 35.

The shaft 31 is arranged in a substantially coaxial relationship with the center axis 9 and is configured to extend in the axial direction. The shaft 31 is made of metal, e.g., stainless steel. The shaft 31 is supported by the sleeve 23 and the cap 24 with a lubricant 41 interposed therebetween and is rotated about the center axis 9. The upper end portion of the shaft 31 protrudes upward beyond an upper surface of the sleeve 23.

The rotor hub 32 preferably includes a top plate portion 61, a hub protrusion portion 62 and a disk support portion 63. The top plate portion 61 is positioned above the base plate 21, the stator 22 and the sleeve 23 to extend at a substantially right angle with respect to the center axis 9. The radial inner edge portion of the top plate portion 61 is fixed to the upper end portion of the shaft 31. The hub protrusion portion 62 extends downward from the top plate portion 61 in a substantially cylindrical shape.

The disk support portion 63 is positioned radially outward of the top plate portion 61. The disk support portion 63 preferably includes a substantially cylindrical first support surface 631 and a second support surface 632 extending radially outward from the lower end portion of the first support surface 631. At least a portion of the inner circumferential portion of the magnetic disk 12 makes contact with the first support surface 631. At least a portion of the lower surface of the magnetic disk 12 makes contact with the second support surface 632. Thus, the magnetic disk 12 is positioned and supported in the radial direction and the axial direction.

In the present embodiment, the rotor hub 32 as a whole is made of, e.g., a ferromagnetic material. The rotor magnets 34 and the rotor yoke 35 are magnetically connected to each other by the rotor hub 32. It is preferred that at least the portion of the rotor hub 32 interconnecting the rotor magnets 34 and the rotor yoke 35 is made of a ferromagnetic material. For example, the top plate portion and the hub protrusion portion 62 may be made of a ferromagnetic material such as iron or magnetic stainless steel. The disk support portion 63 may be made of a non-magnetic material such as aluminum or non-magnetic stainless steel. The shaft 31 and the rotor hub 32 may be formed into a single piece.

The ring-shaped member 33 is an annular component positioned radially inward of the hub protrusion portion 62. The upper surface of the ring-shaped member 33 makes contact with the lower surface of the top plate portion 61. The radial outer surface of the ring-shaped member 33 is press-fitted to the inner circumferential surface of the hub protrusion portion 62 or fixed to the inner circumferential surface of the hub protrusion portion 62 by a fixing means such as an adhesive agent or the like.

A lubricant 41 exists between the sleeve 23 and the cap 24 and between the shaft 31, the rotor hub 32 and the ring-shaped member 33. The liquid surface of the lubricant 41 is positioned between the outer circumferential surface of the sleeve 23 and the inner circumferential surface of the ring-shaped member 33. The shaft 31, the rotor hub 32 and the ring-shaped member 33 are rotatably supported on the sleeve 23 and the cap 24 through the lubricant 41. In the present embodiment, a bearing mechanism 4 is made up of: the sleeve 23 and the cap 24, both of which belong to the stationary unit 2; the shaft 31, the rotor hub 32 and the ring-shaped member 33, all of which belong to the rotary unit 3; and the lubricant 41 existing therebetween. For example, polyol-ester-based oil or diester-based lubricating fluid is used as the lubricant 41.

A radial dynamic pressure groove array is provided on at least one of the inner circumferential surface of the sleeve 23 and the outer circumferential surface of the shaft 31. The radial dynamic pressure groove array is formed into, e.g., a herringbone shape. Upon driving the spindle motor 11, the radial dynamic pressure groove array induces a radial dynamic pressure in the lubricant 41 existing between the sleeve 23 and the shaft 31. By virtue of the radial dynamic pressure, the shaft 31 is radially supported with respect to the sleeve 23.

A thrust dynamic pressure groove array is provided on at least one of the upper surface of the sleeve 23 and the lower surface of the top plate portion 61. The thrust dynamic pressure groove array is formed into, e.g., a herringbone shape or a spiral shape. Upon driving the spindle motor 11, the thrust dynamic pressure groove array induces an axial dynamic pressure in the lubricant 41 existing between the sleeve 23 and the rotor hub 32. By virtue of the axial dynamic pressure, the rotor hub 32 is axially supported with reference to the sleeve 23.

The rotor magnets 34 are fixed to the lower surface of the top plate portion 61 of the rotor hub 32 by, e.g., an adhesive agent. The rotor magnets 34 are positioned above the stator 22. The rotor magnets 34 and the coils 221 provided on the upper surface of the stator 22 are axially opposed to each other through a first gap 101. The lower surface of each of the rotor magnets 34 becomes a magnetic pole surface. The rotor magnets 34 are arranged along the circumferential direction so that the magnetic pole surfaces of N pole and the magnetic pole surfaces of S pole can be alternately positioned side by side. A single annular rotor magnet alternately magnetized with N poles and S poles along the circumferential direction may be used in place of the rotor magnets 34.

The rotor yoke 35 is made of, e.g., a ferromagnetic material, and is rotated together with the rotor hub 32 and the rotor magnets 34. The rotor yoke 35 of the present embodiment preferably includes a yoke plate portion 71 and a yoke protrusion portion 72. The yoke plate portion 71 is positioned below the stator 22, above the bottom plate portion 51 of the base plate 21 and radially inward of the first outer protrusion portion 54 of the base plate 21. The yoke plate portion 71 extends in a substantially disc-like shape along the lower surface of the stator 22. The upper surface of the yoke plate portion 71 and the lower surface of the stator 22 are axially opposed to each other through a second gap 102. The yoke protrusion portion 72 is positioned radially inward of the stator 22 to extend upward from the yoke plate portion 71 in a substantially cylindrical shape. The yoke protrusion portion 72 is fixed to the hub protrusion portion 62.

In the spindle motor 11 described above, if a drive current is supplied to the coils 221, magnetic fluxes axially penetrating the stator 22 are generated. A magnetic circuit passing through the stator 22, the rotor magnets 34, the rotor hub 32 and the rotor yoke 35 is formed. Circumferential torque is generated by the action of the magnetic fluxes. As a result, the rotary unit 3 is rotated about the center axis 9 with respect to the stationary unit 2. The magnetic disk 12 supported on the rotor hub 32 is rotated about the center axis 9 together with the rotary unit 3.

Next, the magnetic portion 25 will be described in detail.

Figure 7:
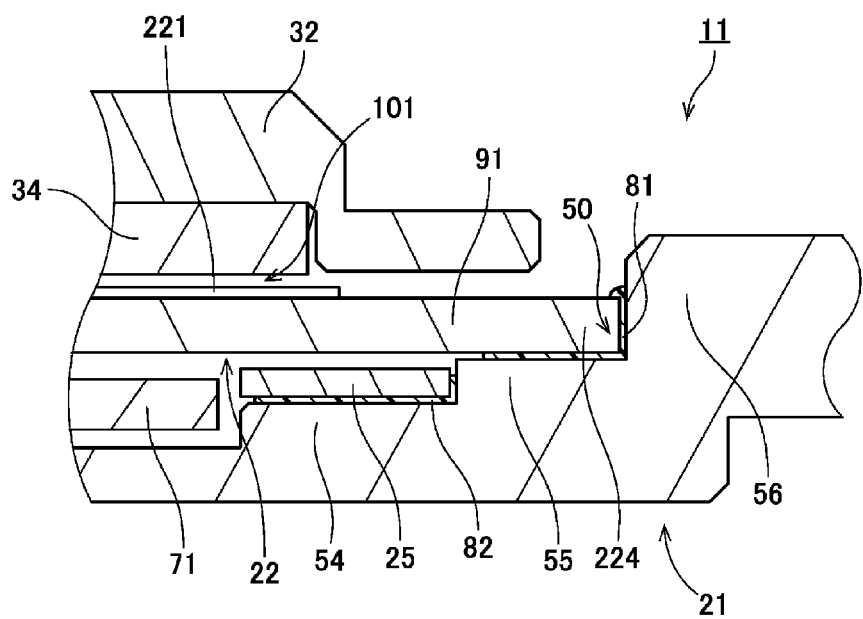
FIG. 7 is a partial vertical section view of the spindle motor according to the third preferred embodiment of the present invention.

FIG. 7 is a partial vertical section view of the spindle motor 11. As shown in FIG. 7, the magnetic portion 25 is fixed to the upper surface of the first outer protrusion portion 54 of the base plate 21 by an adhesive agent 82. In other words, the magnetic portion 25 is arranged radially inward of the second outer protrusion portion 55, radially outward of the yoke plate portion 71 and below the stator 22. The magnetic portion 25 of the present embodiment is a flat component differing from the base plate 21. The magnetic portion 25 is arranged to annularly surround the center axis 9 and is arranged in a substantially coaxial relationship with the center axis 9. The coils 221 of the stator 22 and the magnetic portion 25 at least partially overlap with each other in the axial direction.

The magnetic portion 25 is made of, e.g., a ferromagnetic material such as iron or magnetic stainless steel. For that reason, a magnetic attraction force is generated between the magnetic portion 25 and the rotor magnets 34. The magnetic attraction force has an axial component. The rotary unit 3 is pulled downward by the magnetic attraction force generated between the magnetic portion 25 and the rotor magnets 34. As a result, the rotary unit 3 is stably supported with respect to the stationary unit 2.

During the operation of the spindle motor 11, an upward pressure is applied to the rotary unit 3 under the action of the dynamic pressure induced by the thrust dynamic pressure groove array. The rotor hub 32 is stably rotated with the aid of the upward pressure applied by the thrust dynamic pressure and the downward magnetic attraction force generated by the magnetic portion 25.

Particularly, in case of the structure of the spindle motor 11 in which the stator 22 and the rotor magnets 34 are axially opposed to each other, axial magnetic attraction forces and axial magnetic repulsion forces are alternately generated between the stator 22 and the rotor magnets 34. The magnetic attraction forces and the magnetic repulsion forces may be a cause of vibration of the spindle motor 11. In the spindle motor 11 of the present embodiment, however, a continuous magnetic attraction force is generated between the magnetic portion 25 and the rotor magnets 34 independently of the magnetic attraction forces and the magnetic repulsion forces stated above. This helps suppress the vibration of the spindle motor 11.

Assuming that the magnetic portion 25 is arranged on the upper surface of the stator 22, the flow of magnetic fluxes between the rotor magnets 34 and the stator 22 may possibly be impeded by the magnetic portion 25. In the spindle motor 11 of the present embodiment, however, the magnetic portion 25 is arranged below the stator 22. For that reason, the magnetic fluxes can efficiently flow between the rotor magnets 34 and the stator 22. The magnetic portion 25 inhibits the magnetic fluxes generated between the rotor magnets 34 and the stator 22 from being leaked radially outward. Therefore, as compared with a case where the magnetic portion 25 is absent, the magnetic fluxes can efficiently flow between the rotor magnets 34 and the stator 22.

Particularly, in the present embodiment, the radial inner end portion of the magnetic portion 25 is positioned radially inward of the radial outer end portions of the rotor magnets 34. In other words, a portion of the magnetic portion 25 and a portion of each of the rotor magnets 34 axially overlap with each other. This helps make larger the axial component of the magnetic attraction force generated between the magnetic portion 25 and the rotor magnets 34. Accordingly, the rotary unit 3 can be pulled further downward.

In the present embodiment, the radial inner end portion of the magnetic portion 25 is positioned radially outward of the radial outer end portion of the rotor yoke 35. For that reason, the magnetic portion 25 and the rotor yoke 35 do not limit their axial positions. Therefore, as shown in FIG. 7, the magnetic portion 25 and the yoke plate portion 71 can be arranged so that they can at least partially overlap with each other in the axial direction. This makes it possible to reduce the axial dimension of the magnetic portion 25 and the yoke plate portion 71 as a whole. Accordingly, it is possible to reduce the axial dimension of the spindle motor 11.

In order to increase the magnetic attraction force generated between the magnetic portion 25 and the rotor magnets 34, it is preferable to shorten the axial distance between the magnetic portion 25 and the rotor magnets 34. For example, as shown in FIG. 7, the upper surface of the magnetic portion 25 is preferably arranged higher than the upper surface of the yoke plate portion 71. If the distance between the magnetic portion 25 and the rotor magnets 34 is reduced, it is possible to reduce the plan-view area of the magnetic portion 25 while obtaining the necessary magnetic attraction force. As a result, it is possible to increase the plan-view area of the rotor yoke 35. This enables the magnetic fluxes to efficiently flow through the magnetic circuit made up of the stator 22, the rotor magnets 34, the rotor hub 32 and the rotor yoke 35.

The base plate 21 of the present embodiment is provided with the second outer protrusion portion 55 protruding upward at the radial outer side of the magnetic portion 25. The stator 22 is arranged on the upper surface of the second outer protrusion portion 55 and not on the upper surface of magnetic portion 25. The upper surface of the magnetic portion 25 and the lower surface of the stator 22 are axially opposed to each other with a clearance left therebetween. For that reason, the stator 22 can be arranged with increased axial accuracy with respect to the base plate 21 with no influence of the dimensional error or positioning error of the magnetic portion 25.

If the magnetic portion 25 is arranged below the stator 22 as in the present embodiment, it becomes easy to increase the axial thickness of the magnetic portion 25. For example, as shown in FIG. 7, the axial thickness of the magnetic portion 25 can be set larger than the axial distance of the first gap 101.

The first gap 101 is defined between the upper surface of the stator 22 and the lower surfaces of the rotor magnets 34. If the axial thickness of the magnetic portion 25 is increased, it is possible to inhibit generation of magnetic saturation in the magnetic portion 25.

Next, the structure of fixing the stator 22 to the base plate 21 will be described in detail.

As shown in FIG. 7, the base plate 21 and the stator 22 are fixed to each other by an adhesive agent 81. In the present embodiment, the adhesive agent 81 exists between the step portion 50, which is made up of the upper surface of the second outer protrusion portion 55 and the inner circumferential surface of the third outer protrusion portion 56, and the ring-shaped plate portion 91 of the stator 22. The upper surface of the second outer protrusion portion 55 and the lower surface of the ring-shaped plate portion 91 may make partial contact with each other. Likewise, the inner circumferential surface of the third outer protrusion portion 56 and the outer circumferential portion of the ring-shaped plate portion 91 may make partial contact with each other.

Minute irregularities exist on the surface of the stator 22, the upper surface of the second outer protrusion portion 55 and the inner circumferential surface of the third outer protrusion portion 56. The irregularities and the adhesive agent 81 make close contact with each other, whereby the upward removal of the stator 22 is prevented by a so-called anchor effect. As a result, the base plate 21 and the stator 22 are strongly fixed to each other.

In the present embodiment, the outer circumferential portion of the rotor hub 32 is positioned radially outward of the outer circumferential portions of the coils 221. The outer circumferential portion of the ring-shaped plate portion 91 is positioned radially outward of the outer circumferential portion of the rotor hub 32. In other words, the ring-shaped plate portion 91 of the present embodiment includes the protrusion 224 positioned more outwardly than the coils 221 and protruding radially outward beyond the outer circumferential portion of the rotor hub 32. If the magnetic disk 12 is attached to the spindle motor 11, the lower surface of the magnetic disk 12 and the upper surface of the protrusion 224 are axially opposed to each other with a clearance left therebetween.

When seen in a top view, the protrusion 224 is positioned radially outward of the rotor hub 32. For that reason, when the stator 22 and the rotor hub 32 are fixed to the base plate 21 as in the below-mentioned manufacturing process of the spindle motor 11, the protrusion 224 of the stator 22 can be firmly pressed against the base plate 21 with no hindrance of the rotor hub 32. Accordingly, the stator 22 can be easily and strongly fixed to the base plate 21.

In the present embodiment, the single protrusion 224 annularly extends in the circumferential direction along the outer circumferential portion of the ring-shaped plate portion 91. Alternatively, the ring-shaped plate portion 91 may include a plurality of protrusions 224 arranged in the circumferential direction. In other words, the number of the protrusions 224 provided in the outer circumferential portion of the ring-shaped plate portion 91 may be one or two or more. It is however preferred that the positions of the protrusions 224 are not too much uneven. For example, it is preferred that, when the ring-shaped plate portion 91 is divided into two parts by an arbitrary plane containing the center axis 9, each of the parts includes a portion or a whole portion of each of the protrusions 224.

It is hard for the magnetic fluxes of the rotor magnets 34 to reach the protrusion 224. In the present embodiment, the coils 221 are not arranged in the protrusion 224. In other words, the radial outer end portions of the coils 221 are positioned radially inward of the outer circumferential portion of the rotor hub 32. This makes it possible to reduce the length of the copper foils making up the coils 221. Accordingly, it is possible to reduce the electric resistance of the coils 221.

In the present embodiment, as shown in FIG. 7, at least a portion of the adhesive agent 81 makes contact with the upper surface of the stator 22. This helps further increase the fixing strength of the stator 22 with respect to the base plate 21. If the adhesive agent 81 is spread up to the upper surface of the stator 22, it becomes easy to check the application state of the adhesive agent 81 from above.

Figure 8:
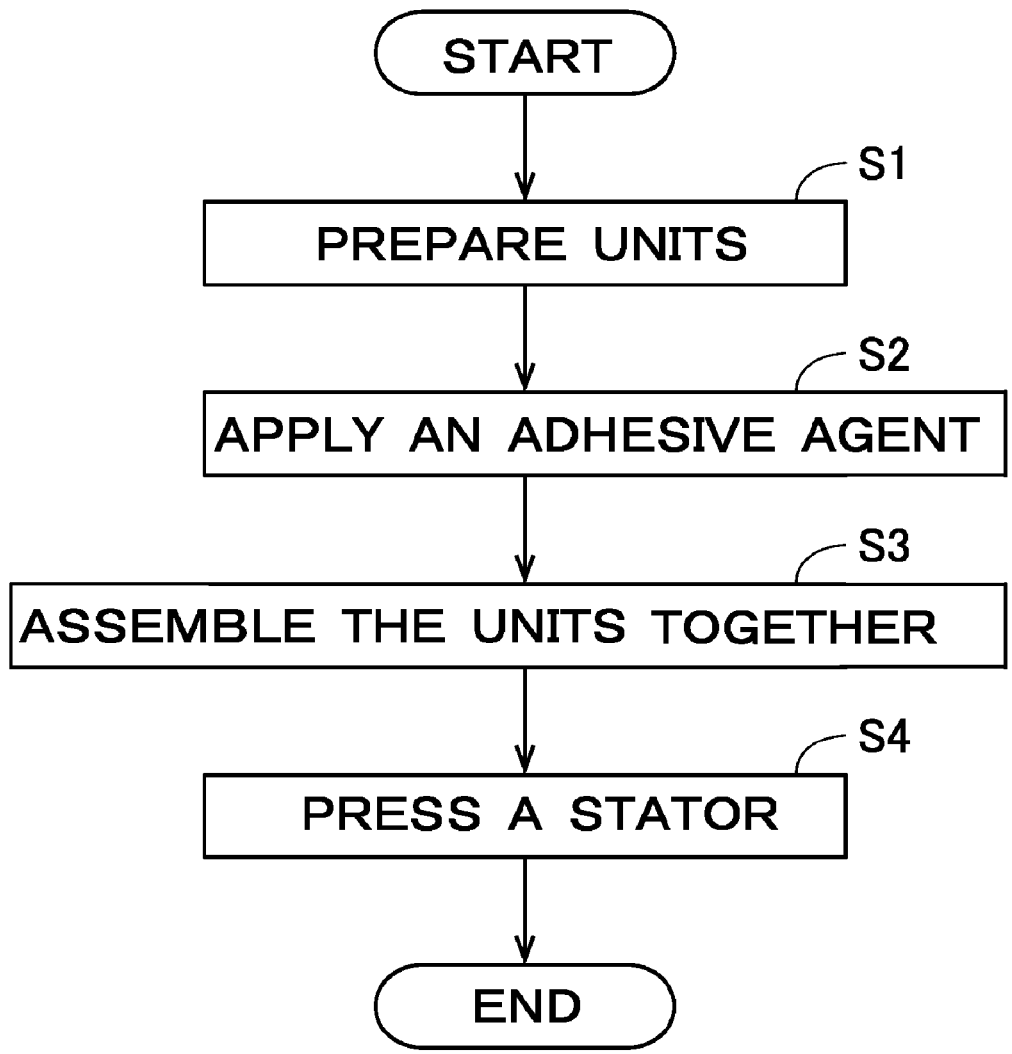
FIG. 8 is a flowchart illustrating some of the manufacturing steps of the spindle motor.
Figure 9:
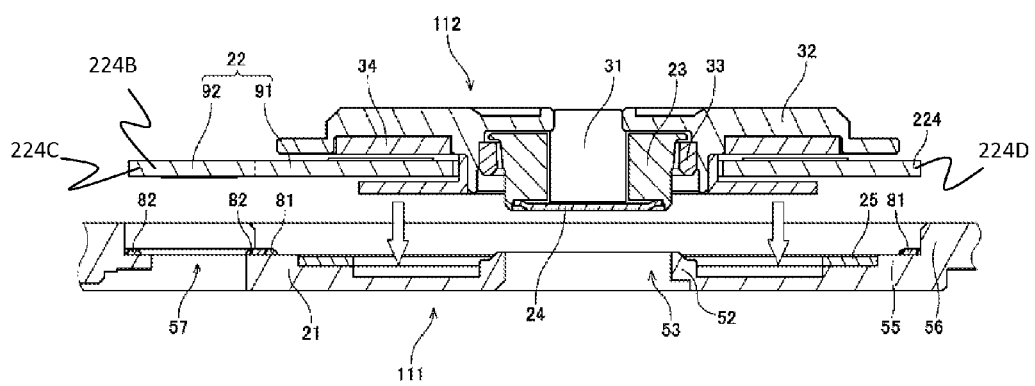
FIG. 9 is a vertical section view showing the spindle motor under a manufacturing process.

FIG. 8 is a flowchart illustrating some of the manufacturing steps of the spindle motor 11. FIG. 9 is a vertical section view showing the spindle motor under a manufacturing process. A manufacturing sequence of the spindle motor 11 will now be described with reference to FIGS. 8 and 9.

When manufacturing the spindle motor 11, a first unit 111 including the base plate 21 and the magnetic portion 25 and a second unit 112 including the stator 22, the sleeve 23, the cap 24, the shaft 31, the rotor hub 32, the ring-shaped member 33, the rotor magnets 34 and the rotor yoke 35 are prepared first (step S1).

Next, the adhesive agent 81 is applied on the upper surface of the second outer protrusion portion 55 of the base plate 21 (step S2). For example, as shown in FIG. 9, the adhesive agent 81 is annularly applied on the border region between the upper surface of the second outer protrusion portion 55 and the inner circumferential surface of the third outer protrusion portion 56. The adhesive agent 81 may be applied on the stator 22. For example, the adhesive agent 81 may be applied on the lower surface of the outer circumferential portion of the ring-shaped plate portion 91.

If the application of the adhesive agent 81 is finished, the second unit 112 is fixed to the first unit 111 (step S3). As shown in FIG. 9, the second unit 112 is moved down from the upper side of the first unit 111. Then, the lower portion of the sleeve 23 is inserted into the base through-hole 53. The lower portion of the sleeve 23 is press-fitted to the inner circumferential surface of the inner raised portion 52 and/or fixed to the inner circumferential surface of the inner raised portion 52 by a fixing means such as an adhesive agent or the like. The stator 22 is arranged radially inward of the third outer protrusion portion 56 and above the second outer protrusion portion 55.

Subsequently, the upper surface of the stator 22 positioned radially outward of the rotor hub 32, namely the upper surface of the protrusion 224, is strongly pressed downward (step S4). As a consequence, the adhesive agent 81 is spread between the upper surface of the second outer protrusion portion 55 and the lower surface of the protrusion 224. In addition, the adhesive agent 81 is spread between the inner circumferential surface of the third outer protrusion portion 56 and the outer circumferential portion of the protrusion 224. As a result, the base plate 21 and the stator 22 are strongly fixed to each other.

Thereafter, the assembly including the first unit 111 and the second unit 112 is brought into a thermostatic oven. Then, the adhesive agent 81 is heated within the thermostatic oven, thereby curing the adhesive agent 81.

Figure 10:
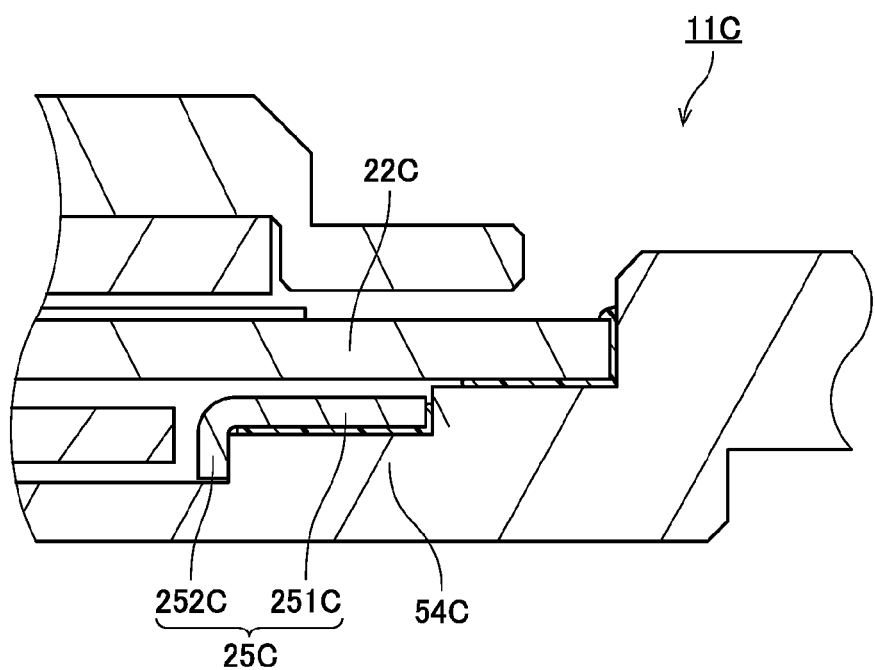
FIG. 10 is a partial vertical section view showing a spindle motor according to one modified example.

FIG. 10 is a partial vertical section view showing a spindle motor 11C according to one modified example. In the modified example shown in FIG. 10, the magnetic portion 25C is curved to have an L-like cross-sectional shape. In other words, the magnetic portion 25C includes a disc portion 251C and a magnetic protrusion portion 252C. The disc portion 251C annularly extends along the lower surface of the stator 22C. The disc portion 251C is arranged on the upper surface of the first outer protrusion portion 54C. The magnetic protrusion portion 252C extends axially downward from the radial inner end portion of the disc portion 251C. If the magnetic portion 25C is curved to have an L-like cross-sectional shape in this manner, the rigidity of the magnetic portion 25C grows larger. Accordingly, it is possible to increase the strength of the magnetic portion 25C while reducing the thickness of the magnetic portion 25C.

The magnetic protrusion portion 252C may extend axially downward from the radial outer end portion of the disc portion 251C. The magnetic protrusion portion 252C may extend axially upward from the radial inner end portion or the radial outer end portion of the disc portion 251C.

Figure 11:
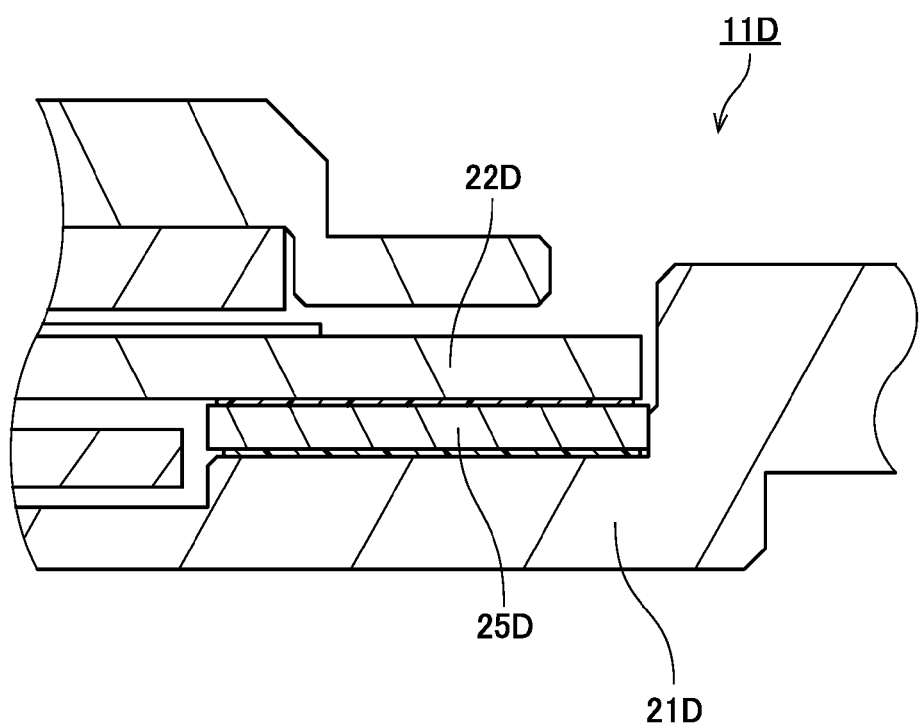
FIG. 11 is a partial vertical section view showing a spindle motor according to another modified example.

FIG. 11 is a partial vertical section view showing a spindle motor 11D according to another modified example. In the modified example shown in FIG. 11, the stator 22D is fixed to the upper surface of the magnetic portion 25D and not the upper surface of the base plate 21D. The outer circumferential surface of the magnetic portion 25D makes contact with the substantially cylindrical surface of the base plate 21D. The magnetic portion 25D is made of metal and can be produced more accurately than the stator 22D, i.e., the circuit board. Therefore, if the base plate 21D and the magnetic portion 25D are accurately positioned in advance in a coaxial relationship with each other, the base plate 21D, the magnetic portion 25D and the stator 22D can be accurately centered by bringing the outer circumferential surface of the magnetic portion 25D into contact with the base plate 21D rather than bringing the outer circumferential portion of the stator 22D into contact with the base plate 21D.

Figure 12:
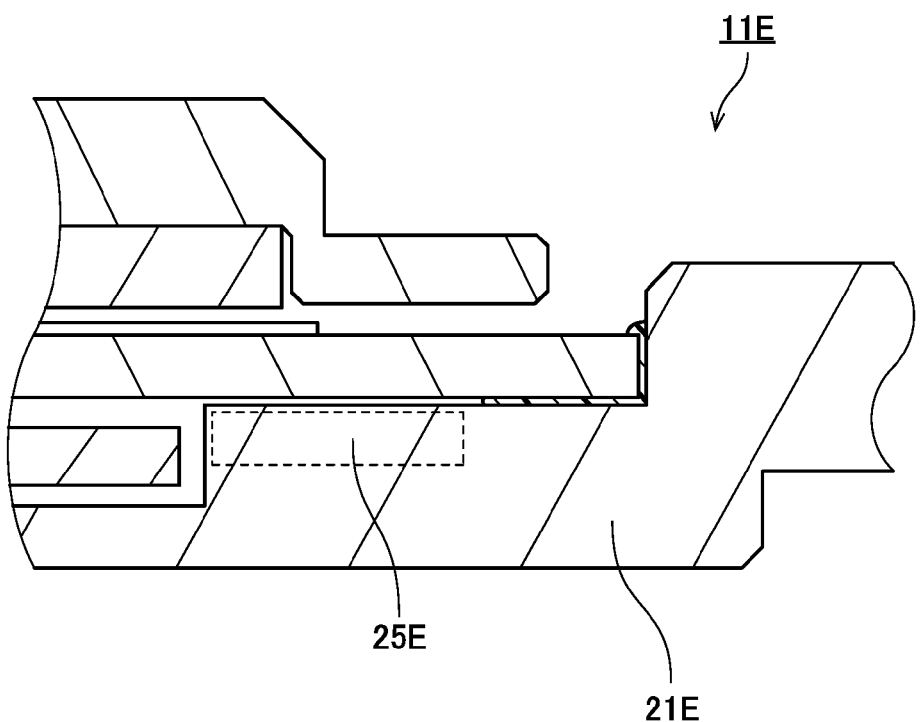
FIG. 12 is a partial vertical section view showing a spindle motor according to a further modified example.

FIG. 12 is a partial vertical section view showing a spindle motor 11E according to a further modified example. In the modified example shown in FIG. 12, the base plate 21E and the magnetic portion 25E are formed into a single piece. The component making up the base plate 21E and the magnetic portion 25E is made of a magnetic material such as iron or magnetic stainless steel. This makes it possible to reduce the number of components of the spindle motor 11E. Accordingly, it is possible to further increase the manufacturing efficiency of the spindle motor 11E.

The spindle motor of the present invention may be a so-called shaft-fixed-type motor in which a shaft belongs to a stationary unit while a sleeve belongs to a rotary unit. The spindle motor and the disk drive apparatus according to the present invention may be used to rotate a disk other than a magnetic disk, e.g., an optical disk. The spindle motor of the present invention can be applied to various kinds of industrial devices.

The specific shapes of the respective components may differ from those shown in the respective figures of the subject application. The respective components of the embodiments and modified examples described above may be appropriately combined unless a conflict arises.

The present invention can find its application in a spindle motor and a disk drive apparatus.

Only selected preferred embodiments have been chosen to illustrate the present invention. To those skilled in the art, however, it will be apparent from the foregoing disclosure that various changes and modifications can be made herein without departing from the scope of the present invention as defined in the appended claims. Furthermore, the foregoing description of the preferred embodiments according to the present invention is provided for illustration only, and not for limiting the invention as defined by the appended claims and their equivalents.

What is claimed is:

1. A spindle motor, comprising:
   a stationary unit, comprising:
      a base plate provided with a step portion, and
      a stator arranged on the base plate, the stator comprising a coil, a first protrusion radially outward the coil, the first protrusion including a power feeding portion; and
   a rotary unit rotatable about a center axis with respect to the stationary unit, rotary unit comprising:
      a rotor hub arranged axially above the base plate;
      a rotor magnet arranged above the stator and axially opposed to the stator with a first gap left between the rotor magnet and the stator; and
      a rotor yoke arranged between the stator and the base plate and axially opposed to the stator with a second gap left between the rotor yoke and the stator,
   wherein a lower surface of the first protrusion is arranged on an upper surface of the step portion,
   wherein the first protrusion extends radially outward the rotor hub such that a first periphery of the first protrusion is fixed on the upper surface of the step portion.

2. The spindle motor according to claim 1, wherein the stator is fixed to the step portion by an adhesive agent.

3. The spindle motor of claim 1, wherein the stator further comprises a second protrusion radially outward the coil.

4. The spindle motor of claim 3, wherein the second protrusion is extended opposite to the first protrusion, wherein the second protrusion extends radially outward the rotor hub such that a second periphery of the second protrusion is fixed on the upper surface of the step portion.

5. The spindle motor of claim 4, wherein the stator can be divided into two parts by a plane containing the center axis such that each of divided portions thus prepared includes a whole portion of the first protrusion and the second protrusion.

6. The spindle motor of claim 3, wherein the first protrusion is kept in contact with a wall surface of the step portion or opposed to the wall surface of the step portion with a clearance left therebetween.

7. The spindle motor of claim 1, wherein the coil has a radial outer end portion positioned radially inward of an outer circumferential portion of the rotor hub.

8. A disk drive apparatus comprising the spindle motor of claim 1.

9. The spindle motor of claim 1, wherein the stator further comprises a ring-shaped plate portion to surround the coil, the ring-shaped plate portion provided between the coil and the first protrusion, wherein a periphery of the ring-shaped plate portion is extended radially outward the rotor hub such that the periphery of the ring-shaped plate portion is fixed on the upper surface of the step portion.

10. A spindle motor for use in a disk drive apparatus provided with a disk, comprising:
   a stationary unit comprising:
      a base plate provided with a step portion, and
      a stator arranged on the base plate, the stator comprising a coil, a first protrusion radially outward the coil, the first protrusion including a power feeding portion; and
   a rotary unit rotatable about a center axis with respect to the stationary unit, rotary unit comprising:
      a rotor hub arranged axially above the base plate;
      a rotor magnet arranged above the stator and axially opposed to the stator with a first gap left between the rotor magnet and the stator; and
      a rotor yoke arranged between the stator and the base plate and axially opposed to the stator with a second gap left between the rotor yoke and the stator,
   wherein a lower surface of the first protrusion is arranged on an upper surface of the step portion, wherein the first protrusion is opposed to the disk in an axially spaced-apart relationship, wherein the first protrusion extends radially outward the rotor hub such that a first periphery of the first protrusion is fixed on the upper surface of the step portion.

11. A spindle motor, comprising:

a stationary unit; and a rotary unit rotatable with respect to the stationary unit through a bearing mechanism, wherein the stationary unit includes a flat stator arranged radially outward of the bearing mechanism to extend in a direction orthogonal to a center axis extending up and down, a base plate arranged to support the stator and a magnetic portion made of a ferromagnetic material, the rotary unit includes a rotor magnet opposed to an upper surface of the stator, a rotor yoke opposed to a lower surface of the stator and made of a ferromagnetic material, and a rotor hub arranged to interconnect the rotor magnet and the rotor yoke and made of a ferromagnetic material, the stator includes a plurality of coils arranged along a circumferential direction, and the magnetic portion is positioned lower than the stator, the coils and the magnetic portion axially overlapping with each other, a radial inner end portion of the magnetic portion positioned radially outward of a radial outer end portion of the rotor yoke.

12. The spindle motor of claim 11, wherein the magnetic portion has a radial inner end portion positioned radially inward of a radial outer end portion of the rotor magnet.

13. The spindle motor of claim 11, wherein the rotor yoke includes a flat yoke plate portion extending along the lower surface of the stator, the magnetic portion and the yoke plate portion radially overlapping with each other.

14. The spindle motor of claim 11, wherein the rotor yoke has an upper surface opposed to the lower surface of the stator, the magnetic portion having an upper surface positioned higher than an upper surface of the rotor yoke.

15. The spindle motor of claim 11, wherein the base plate includes an outer protrusion portion positioned radially outward of the magnetic portion to protrude upward, the outer protrusion portion having an upper surface making contact with the lower surface of the stator, an adhesive agent existing between an upper surface of the outer protrusion portion and the lower surface of the stator.

16. The spindle motor of claim 15, wherein the upper surface of the magnetic portion and the lower surface of the stator are axially opposed to each other with a clearance left therebetween.

17. The spindle motor of claim 11, wherein the magnetic portion includes a disc portion extending along the lower surface of the stator and a magnetic protrusion portion axially extending from a radial inner end portion or a radial outer end portion of the disc portion.

18. The spindle motor of claim 11, wherein the base plate is made of non-magnetic metal, the magnetic portion being a magnetic component differing from the base plate, the magnetic component being fixed to the base plate.

19. The spindle motor of claim 18, wherein the magnetic component has an outer circumferential surface making contact with the base plate, the stator being fixed to an upper surface of the magnetic component.

20. The spindle motor of claim 11, wherein the base plate and the magnetic portion are formed into a single piece.

21. The spindle motor of claim 11, wherein the magnetic portion has an axial thickness larger than an axial distance of a first gap between the upper surface of the stator and a lower surface of the rotor magnet.

22. The spindle motor of claim 11, wherein the stator has an outer circumferential portion positioned radially outward of an outer circumferential portion of the rotor hub.

23. A disk drive apparatus, comprising:

the spindle motor of claim 11;

an access unit arranged to perform at least one of information reading and writing tasks with respect to a disk supported on the rotary unit of the spindle motor; and a cover making up a housing in cooperation with the base plate of the spindle motor, the rotary unit and the access unit being accommodated within the housing.

24. A spindle motor, comprising:

a stationary unit; and a rotary unit rotatable with respect to the stationary unit through a bearing mechanism, wherein the stationary unit includes a flat stator arranged radially outward of the bearing mechanism to extend in a direction orthogonal to a center axis extending up and down, a base plate arranged to support the stator and a magnetic portion made of a ferromagnetic material, the rotary unit includes a rotor magnet opposed to an upper surface of the stator, a rotor yoke opposed to a lower surface of the stator and made of a ferromagnetic material, and a rotor hub arranged to interconnect the rotor magnet and the rotor yoke and made of a ferromagnetic material, and the base plate is made of non-magnetic metal, the magnetic portion being a component differing from the base plate, the magnetic portion being fixed to the base plate and positioned lower than the stator, a radial inner end portion of the magnetic portion positioned radially outward of a radial outer end portion of the rotor yoke.

25. A disk drive apparatus, comprising:

the spindle motor of claim 24;

an access unit arranged to perform at least one of information reading and writing tasks with respect to a disk supported on the rotary unit of the spindle motor; and a cover making up a housing in cooperation with the base plate of the spindle motor, the rotary unit and the access unit being accommodated within the housing.

* * * * *